(12) United States Patent
Lee et al.

(10) Patent No.: US 10,518,968 B2
(45) Date of Patent: Dec. 31, 2019

(54) BLOCK CONNECTOR FOR SEPTIC TANK AND WATER TREATMENT FACILITY, AND PREFABRICATED BLOCK USING SAME

(71) Applicant: ENSYSTEM CO., LTD, Ulsan (KR)

(72) Inventors: Seung-Man Lee, Ulsan (KR); Seung-Tae Lee, Ulsan (KR)

(73) Assignee: ENSYSTEM Corp., Ulsan (KR)

( * ) Notice: Subject to any disclaimer, the term of this patent is extended or adjusted under 35 U.S.C. 154(b) by 170 days.

(21) Appl. No.: 15/543,161

(22) PCT Filed: Nov. 19, 2015

(86) PCT No.: PCT/KR2015/012447
§ 371 (c)(1),
(2) Date: Jul. 12, 2017

(87) PCT Pub. No.: WO2016/114482
PCT Pub. Date: Jul. 21, 2016

(65) Prior Publication Data
US 2018/0002105 A1 Jan. 4, 2018

(30) Foreign Application Priority Data
Jan. 15, 2015 (KR) .................. 10-2015-0007209

(51) Int. Cl.
*B65D 90/00* (2006.01)
*B65D 88/02* (2006.01)
*F16L 41/14* (2006.01)

(52) U.S. Cl.
CPC ......... *B65D 90/004* (2013.01); *B65D 88/027* (2013.01); *B65D 90/0006* (2013.01); *F16L 41/14* (2013.01); *B65D 2590/0008* (2013.01)

(58) Field of Classification Search
CPC ............... B65D 90/004; B65D 88/027; B65D 90/0006; B65D 2590/0008; E03F 11/00; F16L 41/14; Y02A 20/216
See application file for complete search history.

(56) References Cited

U.S. PATENT DOCUMENTS

| | | | | |
|---|---|---|---|---|
| 594,526 | A | * 11/1897 | Glauber | .................. F16L 41/14 285/210 |
| 3,716,257 | A | * 2/1973 | Hackman | ................ F16L 41/14 285/210 |

(Continued)

FOREIGN PATENT DOCUMENTS

| JP | 2005-188217 A | 7/2005 |
|---|---|---|
| JP | 2006-043527 A | 2/2006 |

(Continued)

OTHER PUBLICATIONS

Office Action for Chinese Application No. 201580073485.X dated Jun. 13, 2018, 7 pages.

(Continued)

*Primary Examiner* — James M Hewitt, II
(74) *Attorney, Agent, or Firm* — Kathleen Y. Rao; Bret E. Field; Bozicevic, Field & Francis LLP

(57) ABSTRACT

The present disclosure provides a block coupler for connecting block to block for septic tank and water treatment facility. The block coupler comprises a body having a flow path therein; an inflow part having an inflow hole formed on one side of the longitudinal ends of the body so as to communicate with the flow path; an outflow part having an outflow hole formed on the other side of the longitudinal ends of the body having the inflow part so as to communicate with the flow path; and a connecting part provided at the outer end of the body having the inflow part so as to prevent the body coupled to the block from being separated.

7 Claims, 3 Drawing Sheets

(56) References Cited

U.S. PATENT DOCUMENTS

| | | | | |
|---|---|---|---|---|
| 4,779,636 A | * | 10/1988 | Crowe | F16L 41/14 |
| | | | | 134/166 C |
| 2009/0032450 A1 | * | 2/2009 | Connelly | B01D 21/0003 |
| | | | | 210/109 |
| 2010/0025407 A1 | * | 2/2010 | Benson | B65D 88/022 |
| | | | | 220/564 |

FOREIGN PATENT DOCUMENTS

| | | |
|---|---|---|
| KR | 20-0332793 Y1 | 11/2003 |
| KR | 10-0988026 B1 | 10/2010 |
| KR | 10-1150269 B1 | 6/2012 |
| KR | 10-2014-0038667 A | 3/2014 |
| KR | 10-2014-0146365 A | 12/2014 |

OTHER PUBLICATIONS

Office Action for Japanese Application No. 2017-556498 dated May 29, 2018, 4 pages.

\* cited by examiner

[Fig. 1]
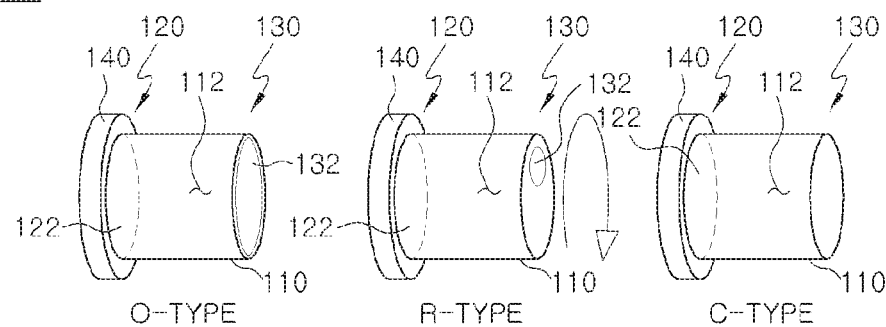
[Fig. 2]
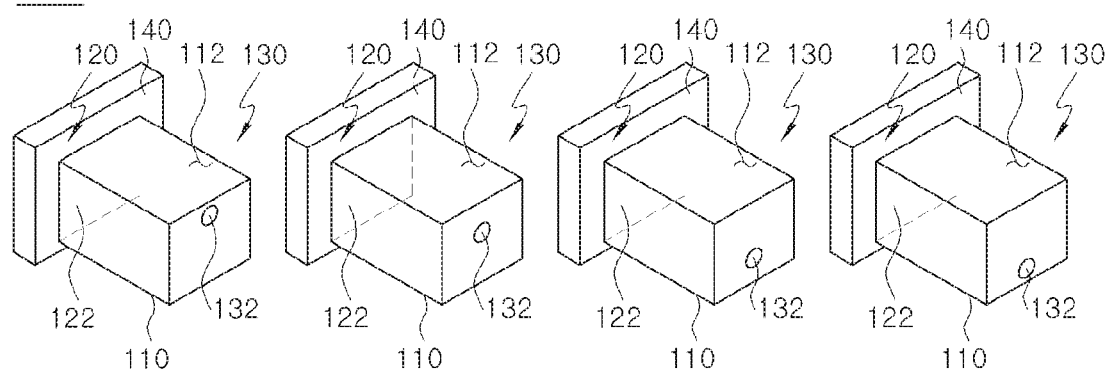
[Fig. 3]
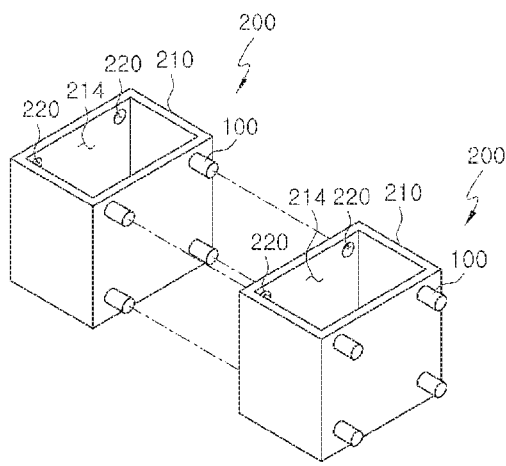

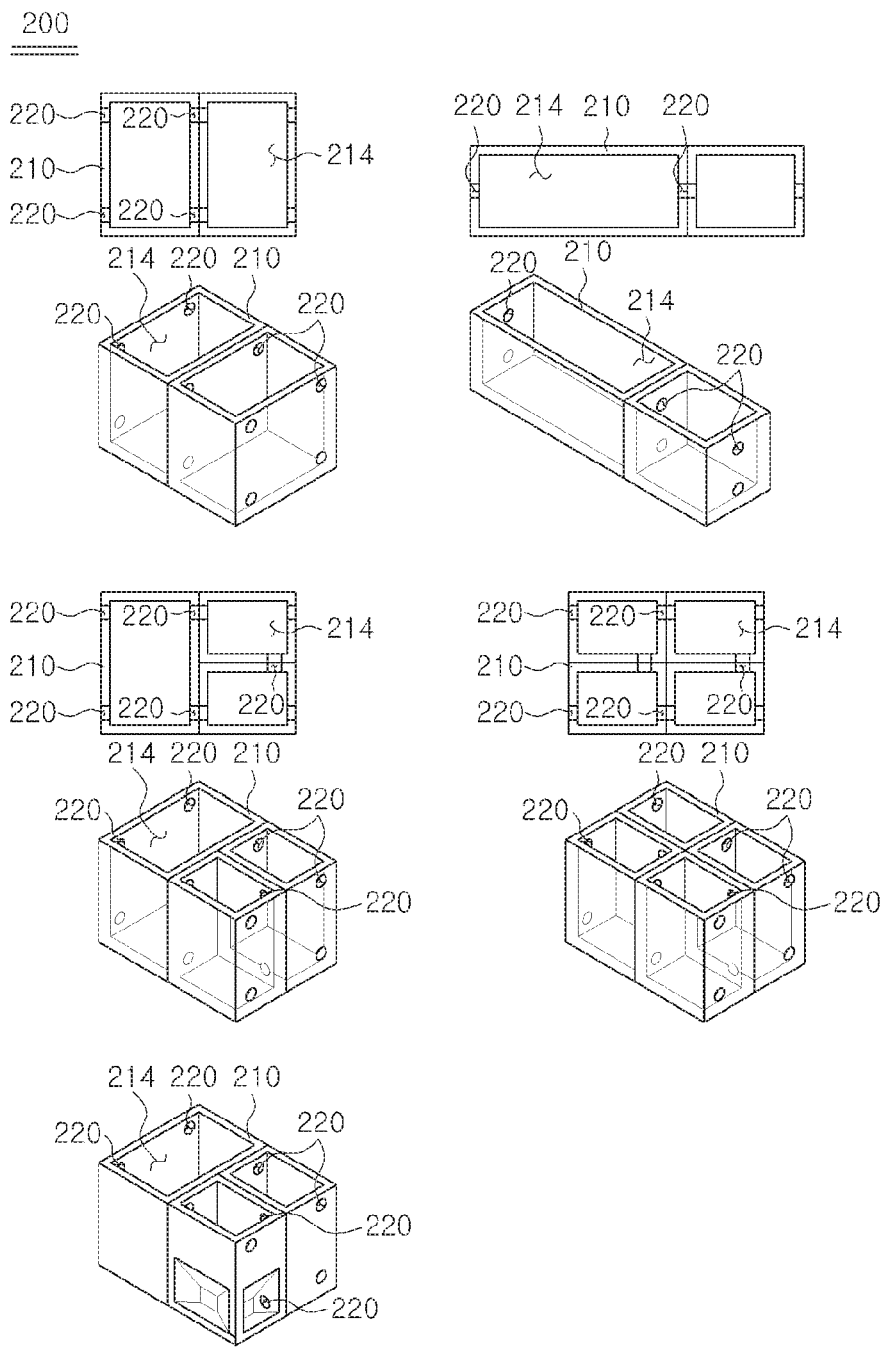
[Fig. 4]

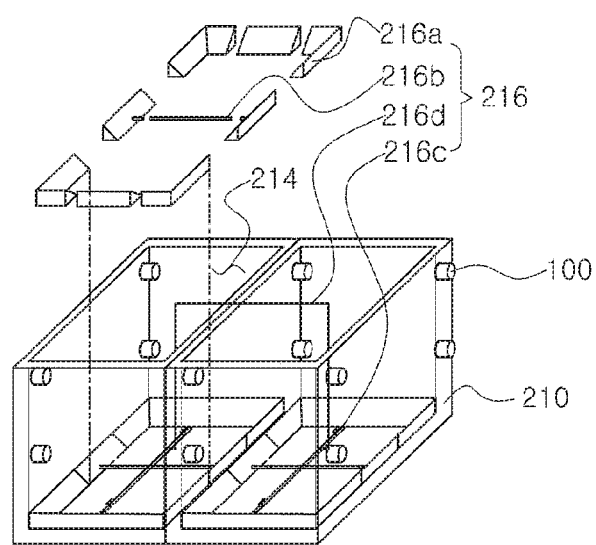
[Fig. 5]

BLOCK CONNECTOR FOR SEPTIC TANK AND WATER TREATMENT FACILITY, AND PREFABRICATED BLOCK USING SAME

CROSS-REFERENCE TO RELATED APPLICATION

This Application is a Section 371 National Stage Application of International Application No. PCT/KR2015/012447 filed Nov. 19, 2015, the contents of which is hereby incorporated by reference in its entirety.

TECHNICAL FIELD

The present invention relates to a block coupler for septic tank and water treatment facility and the assembly block using the same, and more particularly, a block coupler for the septic tank and the water treatment facility and the assembly block using the same, which are employed to interconnect the septic tank with a plurality of blocks laid under the ground for water treatment, and to allow customization of the water treatment facility.

BACKGROUND OF THE INVENTION

In general, the water treatment facilities such as septic tank, sewage treatment facility, waste water treatment facility, and rainwater storage are laid under the ground. Such water treatment facilities are installed in the molds sectioned by the walls into the multiple spaces in the excavated area over which the concretes are deposited and cured. Another installation is to interconnect the blocks that are formed in one type in the factory and delivered to the excavated area. One example is disclosed in the publication of the registered utility model, No. 20-0332793, "Movable concrete module reactor for sewage and waste water treatment facility".

The structure disclosed in the literature consists of the main body formed in one body with all-around side walls and the bottom plane made of the ferroconcretes, the cover interconnected to the open upper plane of the main body, and at least one of the opening parts penetrated into the side walls. Thus, such structure has the effects of shortening the construction time as well as saving the construction cost for the main body can be readily delivered to the construction site, and can be simply installed with improved durability and safety. Also, such structure allows the main bodies to be combined in a variety of forms in parallel or in series for the treatment of sewage and waste waters.

However, the literature does not disclose the specific solutions as to the control and guide of the water level. Moreover, it has disadvantage that the disclosed structure cannot be used for a variety of water treatments due to the opening parts formed at the specific locations of the main body.

SUMMARY OF THE INVENTION

Accordingly, the present invention has been made to solve the aforementioned problems occurring in the related art, and it is an objective of the present invention to provide a block coupler for the septic tank and the water treatment facility and the self-assembly block using the same, which allow the customization of the septic tank and various types of water treatment facilities and thereby improve the usability.

In addition, it is an objective of the present invention to provide a block coupler for the septic tank and the water treatment facility and the assembly block using the same, by which the flowed-in fluid can be efficiently guided as the block-to-block interconnection can be made firm, and the flow path between the blocks can be simply formed.

Also, it is an objective of the present invention to provide a block coupler for the septic tank and the water treatment facility and the self-assembly block using the same, which shorten the construction time and save the cost as the details accompanied by the installation can be reduced.

Also, it is an objective of the present invention to provide a block coupler for the septic tank and the water treatment facility and the assembly block using the same, which do not cause the problem of environmental contamination as the sewage and waste waters are prevented from being leaked out due to the firm construction.

Furthermore, it is an objective of the present invention to provide a block coupler for the septic tank and the water treatment facility and the self-assembly block using the same, which allow the easy installation and removal as well as the easy replacement or repair due to aging or damage.

Technical Solution

To achieve the above and other objects, in accordance with an embodiment of the present invention, there is provided a block coupler for connecting block to block for the septic tank and the water treatment facility comprising; a body having a flow path therein; an inflow part having an inflow hole formed on one side of the longitudinal ends of the body so as to communicate with the flow path; an outflow part having an outflow hole formed on the other side of the longitudinal ends of the body having the inflow part so as to communicate with the flow path; and a latch part provided at the outer end of the body having the inflow part so as to prevent the body coupled to the block from being separated.

The outflow hole has the size smaller than the diameter of the body, and is provided at the predetermined location in the edge of the outflow part.

The outflow part is not provided with the outflow hole so as to shut off the flow path.

The body is formed with the multi-sided shape.

According to the embodiment of the present invention, it is an another objective to provide a assembly block using a block coupler for the septic tank and the water treatment facility comprising; the upper cover that is able to open and close; a housing with the vacant space inside; at least one of coupling grooves provided at the side of the housing; and a coupler that is inserted and interconnected to the groove so as to control the flow path and level of the fluid flowing into the housing.

The coupler is formed in one body with the housing.

The hopper assembly is coupled in the inside of the housing.

Advantageous Effect

According to the embodiment of the present invention having the above-described configuration, the block coupler for the septic tank and the water treatment facility and the self-assembly block using the same allow the customization of the septic tank and various types of water treatment facilities and thereby improve the usability.

Also, it has the effect that the flowed-in fluid can be efficiently guided as the block-to-block interconnection can be made firm, and the flow path between the blocks can be simply formed.

Also, it has the effect that the invention shortens the construction time and saves the cost as the details accompanied with the installation can be reduced.

Also, it has the effect that the invention does not cause the problem of environmental contamination as the sewage and waste waters are prevented from being leaked out due to the firm construction.

Furthermore, it has the effect of allowing the easy installation and removal as well as the easy replacement or repair for the aging or damage.

BRIEF DESCRIPTION OF THE DRAWINGS

The above objects, other features and advantages of the present invention will become more apparent by describing the preferred embodiments thereof with reference to the accompanying drawings, in which:

FIG. 1 is the perspective view showing the general shape of the block coupler for the septic tank and the water treatment facility according to one embodiment of the present invention.

FIG. 2 shows the block coupler formed of the faceted column according to one embodiment of the present invention.

FIG. 3 shows the coupler formed in one body with the block for the septic tank and the water treatment facility according to one embodiment of the present invention.

FIG. 4 shows the various coupling schemes of the self-assembly block using the block coupler for the septic tank and the water treatment facility according to one embodiment of the present invention.

FIG. 5 shows the configuration of coupling the hopper assembly in FIG. 4.

EXPLANATION OF REFERENCE NUMERALS FOR MAIN PARTS IN THE DRAWING

100; block coupler for septic tank and water treatment facility
110; body 112; flow path 120; inflow part
122; inflow hole, 130; outflow part, 132; outflow hole
140; latch part
200; self-assembly block using the block coupler for septic tank and water treatment facility
210; housing, 214; vacancy
216; hopper assembly, 216*a*; support block, 216*b*; support
216*c*; buried metal, 216*d*; metal, 220; coupling groove

DETAILED DESCRIPTION OF THE INVENTION

Hereinafter, a preferred embodiment of the present invention will be described in detail with reference to the accompanying drawings. The line thickness or size of the elements could be exaggeratedly drawn for clarity or convenience.

Also, the terminology used herein is defined in consideration of the function of corresponding components and may be varied according to users and operator's intention or practices. Therefore, the terminology defined herein will be meant to be based on the overall description of the specification.

FIG. 1 is the perspective view showing the general shape of the block coupler for the septic tank and the water treatment facility according to one embodiment of the present invention. FIG. 2 shows the block coupler formed of the faceted column according to one embodiment of the present invention. FIG. 3 shows the coupler formed in one body with the block for the septic tank and the water treatment facility according to one embodiment of the present invention. FIG. 4 shows the various coupling schemes of the assembly block using the block coupler for the septic tank and the water treatment facility according to one embodiment of the present invention. FIG. 5 shows the configuration of coupling the hopper assembly in FIG. 4.

Referring to FIG. 1 to 3, the block coupler (100) for the septic tank and the water treatment facility is used for connecting block to block, and comprises the body (110), the inflow part (120), the outflow part (130) and the latch part (140).

The body (110) is formed in a cylindrical shape with a circular cross section, and the flow path (112) is provided in the inside of the body.

The body (110) not only interconnects block to block as it is inserted perpendicular to the inside walls where the blocks are in contact, but acts as a flow path to which the fluid is sequentially supplied.

The flow path (112) indicates the hollow part inside of the body (110), which is formed in the longitudinal direction of the body (110) so that the fluid can pass inside the body (110).

The inflow part (120) has the inflow hole (122) formed at one end of the longitudinal ends of the body (110) so as to communicate with the flow path (112). The inflow part (120) is the end part at one side of the longitudinal ends of the body (110) where the fluid is flowed-in.

The inflow hole (122) is the part of the inflow part (120) thru which the fluid flows in, that is, the one end part of the longitudinal ends of the body (110) which is drilled open, where the fluid flows in.

The outflow part (130) has the outflow hole (132) at the other side opposite to the inflow part (120) of the longitudinal ends of the body (110) so as to communicate with the flow path (112). The outflow part (130) is the end part at the other side opposite to the inflow part (120) of the longitudinal ends of the body (110), where the fluid that is flowed-in thru the inflow part (120) and flows inside the body (110) flows out.

The outflow hole (132) is the part of the outflow part (130) thru which fluid flows out, that is, the other end part at the other side opposite to the inflow hole (122) of the longitudinal ends of the body (110), which is drilled open. That is, the outflow hole (132) is the outlet of the body (110) where the fluid flows out, and the inflow hole (122) is the inlet of the body (110) where the fluid flows in.

Referring to FIG. 1, the outflow part (130) may not be provided with the outflow hole (132) so as to block the flow path (112). That is, by blocking the outflow hole (132) which is outlet of the body (110), the fluid that is flowed-in thru the inflow hole (122) and flows inside the body (110) may not be flowed out thru the outflow hole (132).

As can be seen in FIG. 1, the outflow hole (132) has the size smaller than the diameter of the body (110) and may be provided at the predetermined location in the edge of the outflow part (130), so that the relative height of the outflow hole (132) may be varied with the body (110) rotation, and thus the level of the outflowing fluid can be finely controlled.

As can be seen in FIG. 1, the aforementioned configuration of the body (110) more in detail consists of O-type, C-type, and R-type.

In O-type, the outflow hole (132) of the outflow part (130) is drilled open in the size of the body (110) diameter. In C-type, the outflow hole (132) of the outflow part (130) is not provided so as to block the flow path (112). In R-type, the outflow hole (132) has the size smaller than the diameter of the body (110) and is provided in the edge of the outflow part (130).

The use of such 3 types can allow the interconnection of block to block in various ways up and down as well as top and bottom, and thus makes possible not only the easy interconnection, but the control of flow path.

The reason that the direction guide of the flow path is required is because depending on the type of the water treatment facility, the various conditions of flow path (up and down, left and right) need to be made on the different stages of water treatment, which is not possible according to the prior patent that does not allow the path guide at all, or allows the path guide only by destructing the structure.

Therefore, the 3 types can be properly used to the characteristics of the various water treatment facilities such as septic tank, sewage treatment facility, waste water treatment facility, and rainwater storage.

The latch part (140) is formed of circular ring shape, and provided at the outer end of the body (110) to prevent the body coupled with the block from being separated. The connecting part (140) is coupled along the edge of the body having the inflow part (120), and prevents the body (110) inserted into the block from falling out as it supports the side plane of the block, which is an appropriate solution for the treatment of the massive water having fast flow rate.

On the other hand, the body (110) could have a cross section of polygon shape.

Referring to FIG. 2, the body (110) is formed with the side planes of square shape which has a configuration similar to the aforementioned cylindrical body except for that the outflow hole (132) is formed at the varying positon of one end plane of the longitudinal ends of the square body having the outflow part (130). Accordingly, the repeated description of the body configuration will be omitted.

The body (110) is formed with the side planes of square shape which is attempted to reduce the assembly tolerance and prevent the free movement of the block by diversifying the contact angle of the body inserted in between the blocks. The side plane shape of the body (110) could be triangle, pentagon, hexagon, etc. as well.

The outflow hole (132) is formed at the varying positon of the outflow part (130). More specifically, the outflow holes (132) are formed at more than one of the arbitrary positions in the square plane of the body (110). This is attempted to make possible the flow guide as well as the control of water level by selectively coupling the bodies (110) having the outflow holes (132) of different positions when the block to block interconnection is made for the objective of the water treatment facility.

Hereinafter, the assembly block (200) will be described, which is assembled using the block coupler (100) for the septic tank and the water treatment facility.

The self-assembly block (200) consists of housing (210), coupling hole (220), and coupler (100). The housing (210) is interconnected with the cover (not shown) that can open and close, and has the space (214) for storing the fluid inside.

The housing (210) is formed of the cube unit with the upper part open, and the respective unit is coupled side to side forming the single assembly which is the structure of the septic tank and the various water treatment facilities.

As can be seen FIG. 4, the housing (210) can be coupled in various configurations such as series, bend, jig-jag, double arrangement, rectangle, etc. according to the environment of construction and the purpose of water treatment facility.

Referring to FIG. 5, the hopper assembly (216) could be coupled inside of the housing (210) for the hopper function used for the purposes of sinking, cleaning, and rotating the fluid.

The hopper assembly (216) consists of support block (216a), tie rod (216b), buried metal (216c) and metal hardware (216d).

The support block (216a) is made of the group with a plurality of units having triangle shape, and installed along the edge of bottom plane of the housing (210) with the both ends of the longitudinal ends interconnected.

The tie rod (216b) is formed of bar shape, and interconnected with the support block (216a) located at the center of housing (210) with the both ends of the longitudinal ends symmetric to each other at the bottom plane of housing (210) so that the buried metal (216c) can be easily installed.

The buried metal (216c) is installed at the bottom plane of the housing (210), and is perpendicular to the tie rod (216b). The center of buried metal is connected to the center portion of the tie rod, and the both ends of the buried metal are extended close to the support blocks (216a) which are provided symmetrically within the housing (210).

The metal hardware (216d) is connected to the buried metal (216c) at one end in one housing (210) and to the buried metal (216c) at the other end in the other housing, respectively, so that the housing to housing is interconnected.

The hopper assembly (216) may be pre-produced and fixed to the housing (210) by self-weight or using adhesive, or the hopper assembly (216) may be connected to the buried metal (216c) by the metal hardware (216d) so that the adjacent hopper assembly can be interconnected. In this case, the conduit or the equipment for water treatment can be fixed to the metal hardware (216d).

At least one of the coupling holes (220) are provided in the side plane of the housing (210). The coupling hole (220) is formed to insert the coupler (100) between the housings (210) and located at the various positions in order to control the flow path and the water level.

The coupler (100) is inserted into the coupling hole (220) so that the flow path and level of the fluid that is flowed into the housing (210) are controlled. The coupler (100) is the block coupler for the septic tank and the water treatment facility and formed of O-type, C-type, and R-type.

The coupler (100) is inserted into the coupling hole (220) of the housing (210) using the 3 types of coupler selectively to carry out the coupling between the housings (210) as well as to control the flow path and the water level.

Moreover, the coupler (100) can be formed in one body with the housing (210), as can be seen FIG. 3, which allows the direct coupling between the housings (210) and thereby has the effects to eliminate the process of inserting the coupler (100) and to reduce the movement of the coupled housing.

Hereinafter, the installation method of the assembly block using the block coupler for the septic tank and the water treatment facility will be described with reference to FIG. 4 to 5.

First, the housings (210) are arranged to be fit for the septic tank and the water treatment facility. Then, the coupler (100) is inserted to the coupling hole (220) in each housing (210) so that the housing to housing is interconnected. In this process, 3 types of coupler (100) are properly coupled to the housing (210) in order to treat the fluid sequentially as the fluid passes the housing (210) and to control the flow path and the water level.

If the fine control of water level is required, the R-type coupler is rotated in left and right direction so that the relative height of the coupling hole (132) is controlled. That is, the water level can be controlled by the various combinations, e.g. by using the rotatable R-type first, and then O-type, C-type, and R-type, selectively.

If the hopper assembly (216) is required, the hopper assembly (216) is inserted into the housing (210), and then the metal hardware (216d) is connected to the buried metal (216c) in the hopper assembly so that the adjacent hopper assemblies are interconnected. When the housing needs to be replaced due to aging or damage, the coupler (100) of the housing to be replaced is removed and the new housing is put in place with the coupler (100) re-inserted. Even in case that the disassembly is necessary, the process described above can be used.

Therefore, the block coupler for the septic tank and the water treatment facility and the self-assembly block according using the same according to the embodiment of the present invention allows the customization of the septic tank and various types of water treatment facilities and thereby improve the usability.

Also, it has the effect that the flowed-in fluid can be efficiently guided as the block-to-block interconnection can be made firm, and the flow path between the blocks can be simply formed.

Also, it has the effect that the invention shortens the construction time and saves the cost as the details accompanied with the installation can be reduced.

Also, it has the effect that the invention does not cause the problem of environmental contamination as the sewage and waste waters are prevented from being leaked out due to the firm construction.

Furthermore, it has the effect of allowing the easy installation and removal as well as the easy replacement or repair for the aging or damage.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

INDUSTRIAL APPLICABILITY

The present invention relates to a block coupler for the septic tank and the water treatment facility and the self-assembly block using the same, and more particularly, a block coupler for the septic tank and the water treatment facility and the self-assembly block using the same, which are employed to interconnect the septic tank with a plurality of blocks laid under the ground for water treatment, and to allow customization of the water treatment facility.

What is claimed is:

1. A block coupler for connecting block to block for a septic tank and water treatment facility comprising;
    a body having a flow path therein;
    an inflow part having an inflow hole formed on one longitudinal end of the body so as to communicate with the flow path; and
    an outflow part having an outflow hole formed on the other longitudinal end of the body so as to communicate with the flow path;
    wherein the outflow hole has a size smaller than the diameter of the body and is provided at a predetermined location in the edge of the outflow part, wherein the relative height of the outflow hole can be varied with rotation of the body.

2. The block coupler for connecting block to block for a septic tank and water treatment facility according to claim 1, wherein the body has a cross section of polygon shape.

3. An assembly block which uses the block coupler for connecting block to block for a septic tank and water treatment facility according to claim 1, further comprising;
    a housing having a vacant space inside and an upper cover being detachably mounted thereon;
    at least one coupling hole provided at the sides of the housing; and
    the block coupler of claim 1 is inserted and connected to the coupling hole so as to control flow path and level of fluid flowing into the housing.

4. The assembly block according to claim 3, wherein the block coupler is formed in one body with the housing.

5. The assembly block according to claim 3, wherein a hopper assembly is coupled in the inside of the housing.

6. The block coupler for connecting block to block for a septic tank and water treatment facility according to claim 1, wherein the body has a cross section of circular shape.

7. The block coupler for connecting block to block for a septic tank and water treatment facility according to claim 1, further comprising a connecting part adjacent the inflow part so as to prevent the body coupled to the block from being separated.

* * * * *